3,660,374
AZO COMPOUNDS FROM ALKYL
α-ANILINOTOLUATES
Max A. Weaver, Herman S. Pridgen, and Clarence A. Coates, Jr., Kingsport, Tenn., assignors to Eastman Kodak Company, Rochester, N.Y.
No Drawing. Filed Nov. 5, 1968, Ser. No. 773,656
Int. Cl. C09b 29/08, 29/24; D06p 3/52
U.S. Cl. 260—207                                          8 Claims

ABSTRACT OF THE DISCLOSURE

Azo compounds containing a phenyl, thiazolyl, benzothiazolyl, thiadiazolyl or thienyl diazo component and an N - alkoxycarbonylbenzyl - N - aralkylaniline coupling component are useful as dyes for hydrophobic textile materials such as polyester fibers on which the compounds exhibit improved build-up, excellent brightness and superior fastness properties such as fastness to light and resistance to sublimation.

---

This invention relates to certain monoazo compounds and to polyester textile materials dyed with the novel monoazo compounds.

The novel monoazo compounds of the invention have the general formula

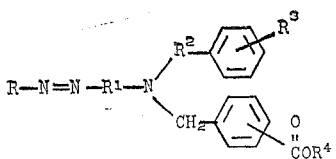

(I)
wherein
R is a phenyl radical, a 2-thiazolyl radical, a 2-benzothiazolyl radical, a 2-thiadiazolyl radical, or a 2-thienyl radical;
$R^1$ is p-phenylene; p-phenylene substituted with lower alkyl, lower alkoxy, halogen, or the group —NHA in which A is an acyl group; 1,4-naphthylene; or 1,4-naphthylene substituted with lower alkyl, lower alkoxy, halogen; or hydroxy;
$R^2$ is alkylene of from 1 to about 2 carbon atoms;
$R^3$ is hydrogen, lower alkyl, lower alkoxy, halogen, hydroxy, or lower alkoxycarbonyl; and
$R^4$ is lower alkyl.

When applied to polyester textile materials according to conventional dyeing procedures, the compounds of the invention exhibit improved build-up, excellent brightness, and superior fastness properties, such as fastness to light and resistance to sublimation. The novel azo compounds impart various shades, ranging from yellow to blue, to polyester fibers. The improved fastness properties possessed by the novel azo compounds allows them to be employed in the dyeing of cotton-polyester fabrics receiving durable press processing. The superior sublimation fastness possessed by the compounds of the invention renders them particularly useful in the thermal fixation technique of dyeing polyester materials.

The diazo component represented by R can be unsubstituted, or, preferably, substituted with, for example, lower alkyl, lower alkoxy, aryl, nitro, halogen, lower alkylthio, lower alkoxycarbonylalkylthio, cyclohexylthio, arylthio, lower aralkylthio, formyl, lower alkanoyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanato, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxycarbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2 - cyanoethoxycarbonyl, 2-hydroxyethoxycarbonyl, etc. are examples of the alkylsulfonyl, alkanoyl, and alkoxycarbonyl groups which can be present on the groups represented by R.

Acetamido, propionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutycarbamoyl are examples of the alkylsulfamoyl and alkylcarbamoyl groups. The aryl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; etc. Benzoyl, p-toloyl, p-chlorobenzoyl, p-nitrobenzoyl, p-ethoxyphenylthio, p-chlorobenzylthio, benzamido, p-toluoylamino, p-tolylsulfonyl, p-ethoxyphenylsulfonyl, etc. are examples of the aryl-containing groups which can be present on the groups represented by R. The acyl groups set forth below in the definition of A are further examples of the groups which can be present on the diazo component.

Illustrative of the phenyl groups which R can represent are 2-chloro-4-nitrophenyl,
4-nitrophenyl,
2-chloro-4-methylsulfonyl,
2,4-di(methylsulfonyl)phenyl,
2-methylsulfonyl-4-nitrophenyl,
2-nitro-4-methylsulfonylphenyl,
2-acetyl-4-nitrophenyl,
2-ethoxycarbonyl-4-nitrophenyl,
2,4-dinitro-6-chlorophenyl,
2-cyano-4,6-dinitrophenyl,
4-methoxycarbonylphenyl,
2-ethylsulfonyl-4,6-dinitrophenyl,
2-formyl-4,6-dinitrophenyl,
2,4-dinitro-6-propionylphenyl,
2-ethoxycarbonyl-4,6-dinitrophenyl,
2-trifluoromethyl-4-nitrophenyl,
2,4-dicyanophenyl,
2-bromo-6-cyano-4-nitrophenyl,
4-nitro-2-sulfamoylphenyl,
2-nitro-4-(dimethyl)sulfamoylphenyl,
4-cyanophenyl,
4-methylsulfonylphenyl,
4-trifluoromethylphenyl,
4-chlorophenyl,
4-ethylsulfamoylphenyl,
4-acetylphenyl,
4-ethylcarbamoylphenyl,
2-carbamoyl-4-nitrophenyl, 2-methylsulfonyl-4-thiocyanatophenyl,
2,6-dichloro-4-nitrophenyl,
2-nitro-4-thiocyanatophenyl,
2-chloro-6-cyano-4-nitrophenyl,
2-cyano-4-nitrophenyl,
2-chloro-4-cyanophenyl,
2-chloro-4-ethoxycarbonylphenyl, and the like. Preferably, the substituted phenyl group R contains not more than three substituents at the para and ortho position.

Typical heterocyclic groups represented by R include
2-thiazolyl,
5-nitro-2-thiazolyl,
5-bromo-2-thiazolyl,
5-thiocyanato-2-thiazolyl,
4-trifluoromethyl-2-thiazolyl,
4-ethoxycarbonyl-2-thiazolyl,
5-cyano-2-thiazolyl,
5-acetamido-2-thiazolyl,
4-methylsulfonyl-2-thiazolyl,
4-methyl-5-nitro-2-thiazolyl,
2-benzothiazolyl,
6-methylsulfonyl-2-benzothiazolyl,
6-ethoxycarbonyl-2-benzothiazolyl,
6-cyano-2-benzothiazolyl,
6-sulfamoyl-2-benzothiazolyl,
6-thiocyanato-2-benzothiazolyl,
6-N,N-di-methylsulfamoyl-2-benzothiazolyl,
4,6-dichloro-2-benzothiazolyl,
4-methyl-6-nitro-2-benzothiazolyl,
5-methyl-1,3,4-thiadiazol-2-yl,
5-thiocyanato-1,3,4-thiadiazol-2-yl,
5-cyclohexylthio-1,3,4-thiadiazol-2-yl,
5-ethylthio-1,3,4-thiadiazol-2-yl,
5-phenylthio-1,3,4-thiadiazol-2-yl,
5-acetamido-1,3,4-thiadiazol-2-yl,
5-chloro-1,3,4-thiadiazol-2-yl,
5-beta-cyanoethylthio-1,3,4-thiadiazol-2-yl,
5-ethoxycarbonylmethylthio-1,3,4-thiadiazol-2-yl,
5-phenylsulfonyl-1,3,4-thiadiazol-2-yl,
3-methylsulfonyl-1,2,4-thiadiazol-5-yl,
3-butylthio-1,2,4-thiadiazol-5-yl,
5-benzoyl-3-nitro-2-thienyl,
3-nitro-5-p-toluoyl-2-thienyl,
3,5-di(methylsulfonyl)-2-thienyl,
5-methylsulfonyl-3-nitro-2-thienyl,
5-ethylsulfamoyl-3-nitro-2-thienyl,
5-ethoxycarbonyl-2-thienyl,
3,5-dinitro-2-thienyl,
3-nitro-2-thienyl, etc.

Preferred groups represented by R have the formula

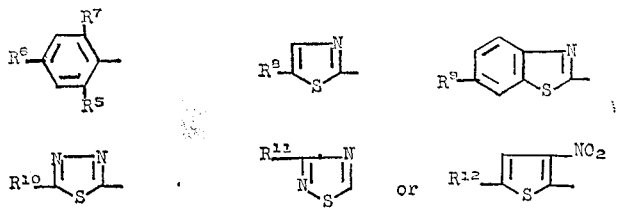

wherein
R⁵ is hydrogen, halogen, cyano or nitro;
R⁶ is nitro, lower alkylsulfonyl, thiocyanato or sulfamoyl;
R⁷ is hydrogen, halogen, formyl; lower alkanoyl, lower alkoxycarbonyl, trifluoromethyl, lower alkylsulfonyl, cyano, sulfamoyl, or carbamoyl;
R⁸ is lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl, phenyl or substituted phenyl;
R⁹ is lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl;
R¹⁰ is lower alkyl, lower alkoxy, halogen, lower alkylthio, benzylthio, cyclohexylthio, phenylthio, substituted phenylthio, phenyl, substituted phenyl, benzyl, lower alkylsulfonyl, lower alkanoylamino, lower alkylsulfonamido, benzamido, lower alkoxycarbonyl, lower alkoxycarbonylalkylthio, thiocyanato, sulfamoyl, or lower alkylsulfamoyl;
R¹¹ is lower alkylthio, cyclohexylthio, benzylthio, or lower alkylsulfonyl; and
R¹² is lower alkanoyl, benzoyl, or substituted benzoyl.

Examples of the alkyl and alkoxy groups and halogen atoms which can be present on the phenylene and naphthylene groups represented by R¹ are set forth above in the definition of the diazo groups. The acyl groups represented by A in the group —NHA, which can be present on the phenylene ring represented by R, can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl and alkylsulfonyl groups can be substituted as described above in the definition of R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl and 2 - chloroethylsulfonyl, are examples of the alkanoyl, alkoxycarbonyl, and alkylsulfonyl groups which A can represent. The aryl group of the aroyl, aryloxycarbonyl, arylsulfonyl, and arylcarbamoyl group is preferably monocyclic, carbocyclic aryl such as unsubstituted phenyl and phenyl substituted with, for example, lower alkyl, lower alkoxy, halogen, etc. Tolyl, anisyl, p-bromophenyl, and c,p-dichloro-phenyl are typical of such aryl groups. Dimethylcarbamoyl, ethylcarbamoyl, propylcarbamoyl, and butylcarbamoyl are illustrative alkylcarbamoyl groups which A can represent.

Examples of the substituents represented by R³ and R⁴ appear hereinabove.

Particularly fast dyeings on polyester materials are obtained from the compounds having the formula

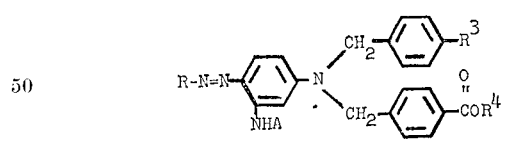

wherein
R represents a group having the formula

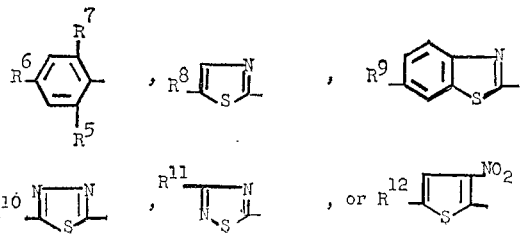

wherein

R⁵ is hydrogen, cyano, or nitro;

R⁶ is nitro, lower alkylsulfonyl, or thiocyanato;

R⁷ is hydrogen, halogen, formyl, lower alkanoyl, lower alkoxycarbonyl, trifluoromethyl, lower alkylsulfonyl, or cyano;

R⁸ is cyano, nitro, lower alkylsulfonyl, or lower alkoxycarbonyl;

R⁹ is cyano, nitro, lower alkylsulfonyl, lower alkoxycarbonyl, or thiocyanato;

R¹⁰ is lower alkyl, lower alkylthio, cyclohexylthio, phenylthio, lower alkylsulfonyl, or lower alkoxycarbonyl;

R¹¹ is lower alkylthio or lower alkylsulfonyl; and

R¹² is lower alkanoyl, benzoyl, lower alkylbenzoyl, lower alkoxybenzoyl, halobenzoyl, or nitrobenzoyl;

A is lower alkanoyl, benzoyl, lower alkoxycarbonyl, lower alkylsulfonyl, or lower alkylcarbamoyl;

R³ is hydrogen, lower alkyl, lower alkoxy, or halogen; and

R⁴ is lower alkyl.

The novel azo compounds of the invention are prepared according to known procedures by diazotizing an amine having the formula R—NH₂ and coupling the resulting diazonium salt with a compound having the formula (II)

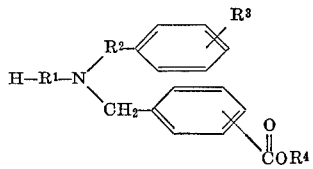

wherein R, R¹, R², R³ and R⁴ are defined above. The diazotizable amines R—NH₂ are well-known compounds which can be prepared according to published procedures. The couplers of Formula II are prepared by known techniques. For example, an aniline compound can be reacted with an alkoxycarbonylbenzaldehyde to obtain the anil which is reduced to give the corresponding N-alkoxycarbonylbenzylaniline compound which can be further reacted with a benzyl halide or aralkyl halide, yielding the coupler. The N-alkoxycarbonylbenzylaniline compound can also be obtained by reacting an aniline with an alkoxycarbonylbenzyl halide. The reactions can be performed in various organic solvents such as N,N-dimethylformamide, N,N-dimethylacetamide, and N-methyl-2-pyrrolidinone. The N - alkoxycarbonylbenzylaniline compounds also can be prepared by reacting a nitrobenzene compound with an alkoxycarbonylbenzaldehyde with simultaneous reduction. The synthesis of a typical coupler is illustrated by the following example.

A mixture of 3'-nitroacetanilide (72.0 g.), 85 g. methyl terephthalaldehydate (85.0 g., 85% pure), ethanol (100 ml.), and Raney nickel (12.0 g.) is hydrogenated at 75° C. and at 1500 p.s.i. until the hydrogen uptake ceases. Enough ethanol is added to the mixture from the autoclave to dissolve the product at 60° C. After removal of the nickel catalyst by filtration, the filtrate is drowned in water. The product is collected by filtration and dried in air. The yield is 79.6 g. of methyl α-(3-acetamidoanilino)-p-toluate which melts at 143–145° C. Methyl α - (3 - acetamidoanilino)-p-toluate (29.8 g.), benzyl chloride (25.2 g.) and N,N - dimethylformamide (30 ml.) are heated and stirred at 95–100° C. for 1.5 hr., and then triethyl amine (28.0 ml.) is added dropwise. Heating is continued at 95–100° C. for an additional hour. The reaction mixture is drowned in 850 ml. of water plus 150 ml. of acetone. The crystalline product is collected by filtration and recrystallized from 1200 ml. of acetone. The product melts at 182–185° C. and has the structure:

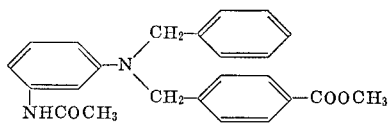

*Analysis.*—Calcd. for C₂₄H₂₄N₂O₃ (percent): C, 74.0; H, 6.2; N, 7.2. Found (percent): C, 74.0; H, 6.0; N, 7.6.

The aniline compounds, substituted with the group —NHA, employed in the synthesis of the couplers are prepared by nitrating an acylanilide and reducing the nitro compound to the corresponding acylamidoaniline. Alternatively, the benzyl substituents can be added to a nitroaniline, by the reactions described above, followed by reduction of the nitro group and acylation of the resulting amino group.

The following table discloses several couplers of Formula II which are prepared according to the procedures described above.

TABLE I

| H—R¹— | R² | R³ | R⁴ |
|---|---|---|---|
| 2-CH₃—C₆H₄— | —CH₂— | H | 4-COOCH₃ |
| 2-NHCOCH₃—C₆H₄— | —CH₂— | H | 4-COOCH₃ |
| 2-OC₂H₅—C₆H₄— | —CH₂— | H | 4-COOCH₃ |
| 3,5-di-CH₃—C₆H₃— | —CH₂— | H | 4-COOCH₃ |
| 2,5-di-CH₃—C₆H₃— | —CH₂— | H | 4-COOCH₃ |
| 3-CH₃—C₆H₄— | —CH₂— | H | 4-COOCH₃ |
| 2-OCH₃-5-Cl—C₆H₄— | —CH₂— | H | 4-COOCH₃ |
| 2-OCH₃-5-NHCOCH₃—C₆H₃— | —CH₂— | H | 4-COOCH₃ |
| 2-OC₂H₅-5-NHCOCH₃—C₆H₃— | —CH₂— | H | 4-COOCH₃ |
| 2-CH₃-3-Cl—C₆H₃— | —CH₂— | H | 4-COOCH₃ |
| 2-CH₅-5-Cl—C₆H₃— | —CH₂— | H | 4-COOCH₃ |
| 2-CH₃-5-NHCOCH₃—C₆H₃— | —CH₂— | H | 4-COOCH₃ |
| 3-NHCOCH₃—C₆H₄— | —CH₂CH₂— | H | 4-COOCH₃ |
| 3-NHCOCH₃—C₆H₄— | —CH₂— | H | 4-COOCH₂CH(CH₃)₂ |
| 3-NHCOCH₃—C₆H₄— | —CH₂— | 4-CH₃— | 3-COOCH₃ |
| 3-NHCOC₆H₅—C₆H₄— | —CH₂— | 4-OC₂H₅ | 3-COOCH₃ |
| 3-NHCOC₂H₅—C₆H₄— | —CH₂— | 4-Cl | 2-COOCH₃ |
| 3-NHCOH—C₆H₄— | —CH₂CH₂— | H | 4-COOC₂H₅ |
| 3-NHCOOC₂H₅—C₆H₄— | —CH₂— | H | 4-COOCH₃ |
| 3-NHSO₂CH₃—C₆H₄— | —CH₂— | H | 4-COOCH₃ |
| 3-NHSO₂C₆H₄-p-CH₃—C₆H₄— | —CH₂— | 2,4-di-OH | 4-COOCH₃ |
| 3-NHCONHC₂H₅—C₆H₄— | —CH₂— | 4-COOCH₃ | 4-COOCH₃ |
| 3-NHCOC₆H₁₁—C₆H₄— | —CH₂— | H | 4-COOCH₃ |

The following examples will further illustrate the preparation of representative azo compounds of the invention.

EXAMPLE 1

To 5 ml. conc. H₂SO₄ is added 0.72 g. of NaNO₂ with stirring. This solution is cooled and 10 ml. 1:5 acid (1 part propionic acid:5 parts acetic acid) is added below 10° C. This is stirred and 1.72 g. 2-chloro-4-nitroaniline is added followed by 10 ml. additional 1:5 acid, all at 0–5° C. The diazotiazation is stirred at 0–5° C., for 3 hr. and then added to a chilled solution of 3.87 g. methyl α-(3-acetamido - N - benzylanilino) - p - toluate dissolved in a mixture of 60 ml. 1:5 acid and 40 ml. 10% hydrochloric acid. The coupling is kept cold (below 5° C.) and buffered with solid ammonium acetate until neutral to Congro Red paper. After allowing to couple for 2 hr., the product is drowned in water, collected by filtration, washed with water and dried in air. The azo compound produces bright red dyeings having excellent fastness to light and sublimation on polyester fibers and has the structure:

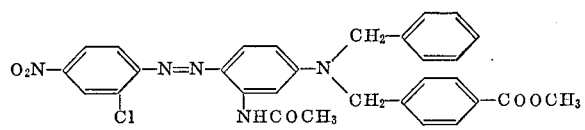

EXAMPLE 2

P-nitroaniline (6.9 g.) is dissolved in 5.4 ml. conc. $H_2SO_4$ and 12.6 ml. water. This solution is poured on 50 g. of crushed ice, and then a solution of 3.6 g. $NaNO_2$ in 8 ml. water is added all at once. The diazotization is stirred at 0–5° C. for 1 hr., and then the solution is added to a chilled solution of methyl α-(3-acetamido-N-benzyl-anilino)-p-toluate (22.5 g.) dissolved in 250 ml. of 1:5 acid. The coupling is kept at 0–5° C. and neutralized with ammonium acetate until it is netutral to Congo Red paper. After coupling 2 hr., the mixture is drowned in water. The product is collected by filtration, washed with water, and air dried. It has the following structure

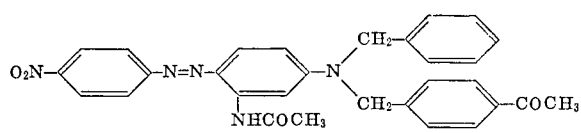

This compound produces bright scarlet shades on polyester fibers.

EXAMPLE 3

Substitution of 2.05 g. of 2-chloro-4-methylsulfonyl-aniline in Example 1 for the amine diazotized in that example yields the dye 4-(2'-chloro-4'-methylsulfonyl-phenylazo) - 3 - acetamido - N benzyl-N-(4'-methoxy-carbonylbenzyl) aniline which give orange dyeings, having outstanding resistance to sublimation, on polyester fibers.

EXAMPLE 4

2-cyano-4,6-dinitroaniline (2.07 g., .01 m.) is dissolved in 75 ml. of conc. $H_2SO_4$ at about 0° C. A nitrosyl sulfuric acid solution prepared by adding 0.72 g. $NaNO_2$ to 5 ml. of conc. $H_2SO_4$ is added portionwise at —5 to 0° C. after being stirred 20 min. at about 0° C., the diazonium solution is added to a cold solution of methyl α - (3 - acetamido - N - benzylanilino)-p-toluate (3.88 g., .01 m.) dissolved in 60 ml. of 15% $H_2SO_4$ plus 40 ml. of 1:5 acid. After allowing to stand 15 min. the coupling mixture is drowned with water. The product is collected by filtration, washed with water, and dried in air. The product

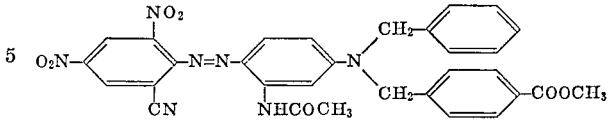

producets bright reddish blue shades on polyester fibers.

EXAMPLE 5

2,6-dichloro-4-nitroaniline (2.07 g., .01 m.) is dissolved in 10 ml. of conc. $H_2SO_4$ at room temperature. The solution is cooled to 0° C. and 0.72 g. of $NaNO_2$ in 5 ml. of conc. $H_2SO_4$ is added at 0° C. The reaction mixture is stirred at 0–5° C. for 2 hr. and is then added to a cold solution of methyl α-(N-benzylanilino) p-toluate (3.3 g.) dissolved in 100 ml. of 1:5 acid. The reaction mixture is buffered by the addition of solid ammonium acetate until a test sample is neutral to Congo Red paper. After allowing to couple 1 hr., the mixture is drowned with water; the product is collected by filtration, washed with water, and dried in air. The product, which has the structure

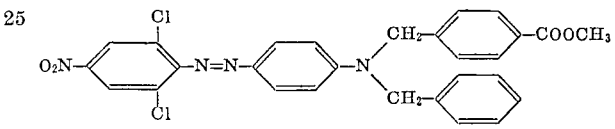

produces brownish yellow shades on polyester fabrics.

EXAMPLE 6

2-chloro-4,6-dinitroaniline (2.18 g.) is diazotized and coupled to 2-methoxy - 5 - acetamido-N-benzyl-N-4-methoxycarbonyl-benzyl) aniline according to the procedure described in Example 1. The product, 4-(2'-chloro-4',6'-dinitrophenylazo)-2-methoxy - 5 - acetamido-N-benzyl-N-(4'-methoxycarbonylbenzyl)aniline, produces a Navy blue shade on polyester fibers.

The azo compounds set forth in Table II, are prepared according to the procedures described in Examples 1–6 and conform to the general formula

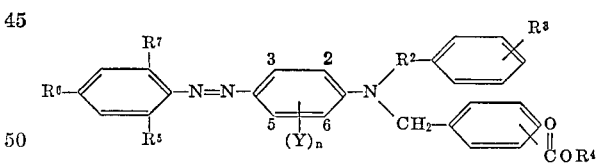

wherein $n$ is 0, 1 or 2.

The color for each of the compounds appearing in Tables II through VI refers to dyeings on polyester fibers.

TABLE II

| Example No. | $R^5$-$R^6$-$R^7$ | $(Y)_n$ | $R^2$ | $R^3$ | Position of —COOR$^4$ | $R^4$ | Color |
|---|---|---|---|---|---|---|---|
| 7 | 2,6-di-Cl-4-$NO_2$ | 2-$CH_3$ | —$CH_2$— | H | 4 | —$CH_3$ | Yellow-brown. |
| 8 | 2,6-di-Cl-4-$NO_2$ | 2-Cl | —$CH_2$— | H | 4 | —$CH_3$ | Do. |
| 9 | 2,6-di-Cl-4-$NO_2$ | 3-$NHCOCH_3$ | —$CH_2$— | H | 4 | —$CH_3$ | Red-brown. |
| 10 | 2,6-di-Cl-4-$NO_2$ | 3-$NHCOOC_2H_5$ | —$CH_2$— | H | 4 | —$CH_3$ | Do. |
| 11 | 2,6-di-Cl-4-$NO_2$ | 2,5-di-$CH_3$ | —$CH_2$— | H | 4 | —$CH_3$ | Brown. |
| 12 | 2-Cl-4-$NO_2$ | 3-$CH_3$ | —$CH_2$— | H | 4 | —$CH_3$ | Red. |
| 13 | 2-Cl-4-$NO_2$ | 3-$NHCOCH_3$ | —$CH_2CH_2$— | H | 4 | —$CH_3$ | Red. |
| 14 | 2-Cl-4-$NO_2$ | 3-$NHCOCH_3$ | —$CH_2$— | 4-$CH_3$ | 4 | —$C_2H_5$ | Red. |
| 15 | 2-Cl-4-$NO_2$ | 3-$NHCOCH_3$ | —$CH_2$— | H | 3 | —$CH_3$ | Red. |
| 16 | 2-Cl-4-$NO_2$ | 3-$NHCOCH_3$ | —$CH_2$— | H | 2 | —$CH_3$ | Red. |
| 17 | 2-Cl-4-$NO_2$ | 3-$NHCOC_6H_5$ | —$CH_2$— | H | 4 | —$CH_3$ | Red. |
| 18 | 2-Cl-4-$NO_2$ | 3-$NHCOOC_2H_5$ | —$CH_2$— | H | 4 | —$CH_3$ | Red. |
| 19 | 2-Cl-4-$NO_2$ | 3-$NHSO_2CH_3$ | —$CH_2$— | H | 4 | —$CH_3$ | Red. |
| 20 | 2-Cl-4-$NO_2$ | 3-$NHSO_2CH_3$ | —$CH_2CH_2$ | 4-Cl | 4 | —$CH_3$ | Red. |
| 21 | 2-Cl-4-$NO_2$ | 3-$NHCONHC_6H_6$ | —$CH_2$— | H | 4 | —$C_2H_5$ | Red. |
| 22 | 2-Cl-4-$NO_2$ | 3-$NHCOC_6H_4$-p-$OCH_3$ | —$CH_2$— | H | 4 | —$C_4H_9$ | Red. |
| 23 | 2-Cl-4-$NO_2$ | 3-$NHCOCH_2Cl$ | —$CH_2$— | H | 4 | —$CH_2CH(CH_3)_2$ | Red. |
| 24 | 2-Cl-4-$NO_2$ | 3-$NHCOCH_2C_6H_5$ | —$CH_2CH_2$— | 4-$OCH_3$ | 4 | —$C_3H_7$ | Red. |
| 25 | 2-Cl-4-$NO_2$ | 3-$NHCOCH_2CN$ | —$CH_2$— | H | 4 | —$CH_3$ | Red. |
| 26 | 2-Cl-4-$NO_2$ | 3-$NHCOCH_2SCH_3$ | —$CH_2$— | H | 3 | —$CH_3$ | Red. |
| 27 | 2-Cl-4-$NO_2$ | 3-$NHCOCH_2SO_2CH_3$ | —$CH_2$— | H | 4 | —$CH_3$ | Red. |

TABLE II—Continued

| Example No. | R⁵-R⁶-R⁷ | (Y)ₙ | R² | R³ | Position of —COOR⁴ | R⁴ | Color |
|---|---|---|---|---|---|---|---|
| 28 | 4-NO₂ | 3-NHSO₂CH₃ | —CH₂— | H | 4 | —CH₃ | Scarlet. |
| 29 | 4-NO₂ | 3-NHCOC₆H₅ | —CH₂— | H | 4 | —CH₃ | Do. |
| 30 | 4-NO₂ | 3-NHCOCH₃ | —CH₂— | H | 3 | —CH₃ | Do. |
| 31 | 4-NO₂ | 3-NHCOCH₃ | —CH₂— | 4-OH | 3 | —C₂H₅ | Do. |
| 32 | 4-NO₂ | 3-NHCOCH₃ | —CH₂— | 4-COOCH₃ | 4 | —CH₃ | Do. |
| 33 | 4-NO₂ | H | —CH₂— | 4-CH₃ | 4 | —CH₃ | Do. |
| 34 | 2-NO₂ | 3-NHCOCH₃ | —CH₂— | H | 4 | —CH₃ | Orange. |
| 35 | 2,4-di-NO₂ | 3-NHCOCH₃ | —CH₂— | H | 4 | —CH₃ | Bordeaux. |
| 36 | 4-Cl-2-Br-6-NO₂ | 3-NHCOCH₃ | —CH₂— | H | 4 | —CH₃ | Red. |
| 37 | 2-SO₂CH₃ | 3-NHCOCH₃ | —CH₂— | H | 4 | —CH₃ | Orange. |
| 38 | 2-SO₂CH₂CH₂CH₂CH₃ | 3-NHCOCH₃ | —CH₂— | H | 4 | —CH₃ | Do. |
| 39 | 4-SO₂CH₃ | 3-NHCOCH₃ | —CH₂— | H | 4 | —CH₃ | Do. |
| 40 | 4-SO₂C₆H₅ | 3-NHCOCH₃ | —CH₂— | H | 4 | —CH₃ | Do. |
| 41 | 2-Cl-4-SO₂CH₃ | 3-NHCOCH₃ | —CH₂— | H | 4 | —CH₃ | Scarlet. |
| 42 | 2-Cl-4-SO₂CH₃ | 3-NHSO₂CH₃ | —CH₂— | H | 4 | —CH₃ | Orange. |
| 43 | 2-Cl-4-SO₂CH₃ | 3-NHCOC₆H₅ | —CH₂— | 4-CH₃ | 3 | —C₂H₅ | Scarlet. |
| 44 | 2,4-di-SO₂CH₃ | 3-NHCOCH₃ | —CH₂CH₂— | H | 4 | —CH₃ | Red. |
| 45 | 2,4-di-SO₂CH₃ | 3-NHSO₂C₆H₄-p-CH₃ | —CH₂— | H | 4 | —CH₃ | Red. |
| 46 | 2-SO₂CH₃-4-NO₂ | 3-CH₃ | —CH₂— | H | 4 | —CH₃ | Red. |
| 47 | 2-SO₂CH₃-4-NO₂ | 3-NHCOCH₃ | —CH₂— | H | 4 | —CH₃ | Bordeaux. |
| 48 | 2-SO₂CH₃-4-NO₂ | 3-NHCOCH₃ | —CH₂— | 4-Cl | 4 | —CH₃ | Do. |
| 49 | 2-SO₂CH₃-4-NO₂ | 3-NHCONHC₂H₅ | —CH₂— | H | 4 | —CH₃ | Do. |
| 50 | 2-SO₂CH₃-4-NO₂ | 3-NHCONH₂ | —CH₂— | H | 4 | —CH₃ | Do. |
| 51 | 2-SO₂CH₃-4-SCN | 3-NHCOCH₃ | —CH₂— | H | 4 | —CH₃ | Scarlet. |
| 52 | 4-Cl-2-SO₂CH₃ | 3-NHCOCH₃ | —CH₂— | 3-OH | 4 | —CH₃ | Do. |
| 53 | 4-Br-2-SO₂C₂H₅ | 3-NHCOCH₃ | —CH₂— | H | 4 | —CH₃ | Do. |
| 54 | 4,6-di-Cl-2-SO₂CH₃ | 3-NHCOCH₃ | —CH₂— | H | 4 | —CH₃ | Do. |
| 55 | 2-CN-4-NO₂ | 3-NHCOOCH₃ | —CH₂— | H | 4 | —C₂H₅ | Red. |
| 56 | 2-COOC₂H₅-4-NO₂ | 3-NHCOCH₃ | —CH₂— | H | 4 | —CH₃ | Red. |
| 57 | 2-CF₃-4-NO₂ | 3-NHSO₂CH₃ | —CH₂— | H | 4 | —CH₃ | Red. |
| 58 | 4-CF₃-2-NO₂ | 3-NHCOCH₃ | —CH₂— | H | 4 | —CH₃ | Scarlet. |
| 59 | 2-NO₂-4-SCN | 3-NHCOCH₃ | —CH₂— | H | 4 | —CH₃ | Do. |
| 60 | 2-NO₂-4-SO₂N(C₂H₅)₂ | 3-NHCOCH₃ | —CH₂— | H | 4 | —CH₃ | Do. |
| 61 | 2-SO₂N(C₂H₅)₂-4-NO₂ | 3-NHCOCH₃ | —CH₂— | H | 4 | —CH₃ | Red. |
| 62 | 2-SO₂NHC₂H₅-4,6-di-NO₂ | 3-NHCOCH₃ | —CH₂— | H | 4 | —CH₃ | Blue. |
| 63 | 2-COOCH₃-4,6-di-NO₂ | 3-NHCOOC₂H₅-2-OCH₃ | —CH₂— | H | 4 | —CH₃ | Do. |
| 64 | 2-CF₃-4,6-di-NO₂ | 3-NHCOC₆H₅ | —CH₂— | H | 4 | —CH₃ | Do. |
| 65 | 2-COCH₃-4,6-di-NO₂ | 3-NHCOCH₃ | —CH₂— | H | 4 | —CH₃ | Do. |
| 66 | 2-Cl-4,6-di-NO₂ | 3-NHCOCH₃ | —CH₂— | Cl | 4 | —CH₃ | Violet. |
| 67 | 2-Br-4,6-di-NO₂ | 2-OCH₃-5-NHCOCH₃ | —CH₂— | H | 4 | —C₂H₅ | Blue. |
| 68 | 2-Cl-4,6-di-NO₂ | 2-OC₂H₅-5-NHCOCH₃ | —CH₂— | H | 4 | —CH₃ | Do. |
| 69 | 2-Cl-4,6-di-NO₂ | 2-OCH₃-5-NHCOCH₃ | —CH₂— | H | 4 | —CH₃ | Do. |
| 70 | 2-Cl-4,6-di-NO₂ | 2-OCH₃-5-NHCOCH₃ | —CH₂— | H | 4 | —CH₃ | Do. |
| 71 | 2-Cl-4,6-di-NO₂ | 2-OCH₃-5-NHCOCH₃ | —CH₂— | H | 4 | —CH₃ | Do. |
| 72 | 2-Cl-4,6-di-NO₂ | 2-OCH₃-5-NHCOCH₃ | —CH₂— | H | 4 | —CH₃ | Do. |
| 73 | 2-CN-4,6-di-NO₂ | 2-CH₃-5-NHCOCH₃ | —CH₂— | H | 4 | —CH₃ | Do. |
| 74 | 2-CN-4,6-di-NO₂ | 3-NHCOOC₂H₅ | —CH₂— | H | 4 | —CH₃ | Do. |
| 75 | 2-CN-4,6-di-NO₂ | 3-NHCOC₆H₄-p-OCH₃ | —CH₂— | H | 4 | —CH₃ | Do. |
| 76 | 2-CN-4,6-di-NO₂ | 3-NHCOCH₃ | —CH₂— | H | 3 | —CH₃ | Do. |
| 77 | 2-CN-4,6-di-NO₂ | 3-NHCOCH₃ | —CH₂— | H | 4 | —C₂H₅ | Do. |
| 78 | 2-CN-4,6-di-NO₂ | 3-NHCOCH₃ | —CH₂— | 4-COOCH₃ | 4 | —CH₃ | Do. |
| 79 | 2-CN-4,6-di-NO₂ | 2-OCH₃-5-NHCOCH₃ | —CH₂— | H | 4 | —CH₃ | Turquoise. |
| 80 | 2-CN-4,6-di-NO₂ | 2-OCH₃-5-NHCOCH₃ | —CH₂— | 3-OCH₃ | 4 | —CH₃ | Do. |
| 81 | 2-CN-4,6-di-NO₂ | 2-OCH₃-5-NHCOCH₃ | —CH₂— | 4-Br | 4 | —CH₃ | Do. |
| 82 | 2-CN-4,6-di-NO₂ | 2-OCH₃-5-NHCOCH₃ | —CH₂CH₂— | H | 4 | —CH₃ | Do. |
| 83 | 2-SO₂CH₃-4,6-di-NO₂ | 3-NHCOCH₃ | —CH₂— | H | 4 | —CH₃ | Blue. |
| 84 | 2-Cl-6-CN-4-NO₂ | 3-NHCOCH₃ | —CH₂— | H | 4 | —CH₃ | Do. |
| 85 | 2,4-di-Cl | 3-NHCOCH₃ | —CH₂— | H | 4 | —CH₃ | Yellow. |
| 86 | 4-SO₂N(CH₃)₂ | 3-NHCOCH₃ | —CH₂— | H | 4 | —CH₃ | Orange. |
| 87 | 4-COOC₂H₅ | 3-NHCOCH₃ | —CH₂— | H | 4 | —CH₃ | Do. |
| 88 | 4-CN | 3-NHCOCH₃ | —CH₂— | H | 4 | —CH₃ | Do. |
| 89 | 2,4-di-CN | 3-NHCOCH₃ | —CH₂— | H | 4 | —CH₃ | Red. |
| 90 | 2-Cl-4-COCH₃ | 3-NHCOCH₃ | —CH₂— | H | 4 | —CH₃ | Orange. |
| 91 | 2-CH₃-4-NO₂ | 3-NHCOCH₃ | —CH₃— | H | 4 | —CH₃ | Scarlet. |
| 92 | 4-CONH₂ | 3-NHCOC₆H₅ | —CH₂— | H | 4 | —CH₃ | Orange. |
| 93 | 4-CON(C₂H₅)₂ | 3-NHCOCH₃ | —CH₂— | H | 4 | —CH₃ | Do. |
| 94 | 2-ClCH₃-4-NO₂ | 3-NHSO₂CH₃ | —CH₂— | H | 4 | —CH₃ | Red. |
| 95 | 4-NHCOCH₃ | 3-NHCOCH₃ | —CH₂— | H | 4 | —CH₃ | Yellow. |

EXAMPLE 96

2-chloro-4,6-dinitroaniline (2.18 g.) is diazotized and coupled with N-benzyl-N-(p-methoxycarbonylbenzyl)-1-naphthylamine (2.91 g.) according to the procedure described in Example 1. The product gives violet dyeings on polyester fibers and has the structure

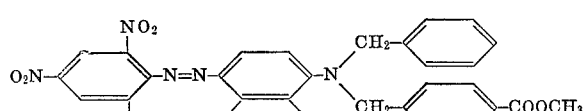

EXAMPLE 97

To 2.9 g. of 2-amino-5-nitrothiazole, stirred in 25 ml. of water, is added 13.6 ml. of conc. H₂SO₄. Solution occurs immediately. The solution is cooled to —10° C. and a solution of 1.4 g. NaNO₂ in 10 ml. conc. H₂SO₄ is added below —5° C. Stirring is continued at about —5° C. for 15 minutes and then the diazonium solution is added to a cold solution of 7.74 g. of methyl α-(3-acetamido-N-benzylanilino)-p-toluate in 120 ml. of 1:5 acid, plus 80 ml. of 10% HCl. After allowing to couple 15 min. at about 5° C., the mixture is drowned with water. The dye is collected by filtration, washed with water, and dried in air. The product

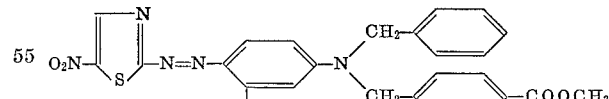

colors polyester fibers a reddish blue shade and exhibits excellent sublimation fasteness.

EXAMPLE 98

To 5 ml. of conc. H₂SO₄ is added 0.72 g. dry NaNO₂ portionwise with stirring. The solution is cooled and 100 ml. of 1:5 acid is added below 15° C. The mixture is cooled further and 1.43 g. of 2-amino-5-carbamoylthiazole is added followed by 10 ml. 1:5 acid, all at 0-5° C. After diazotizing at 0-5° C. for 2 hr. the solution is added to a cool solution of methyl α-(3-acetamido-N-benzylanilino)-p-toluate (3.87 g.) in 60 ml. of 1:5 acid plus 40 ml. of 10% HCl. The reaction is kept cold and buffered with solid ammonium acetate until a test sample is neutral to Congo Red paper. After allowing to couple 1 hr., the mixture is drowned with water. The product is collected by filtration, washed with water, and dried in air. The azo compound obtained produces heavy red shades possessing excellent fastness on polyester fibers. It has the structure

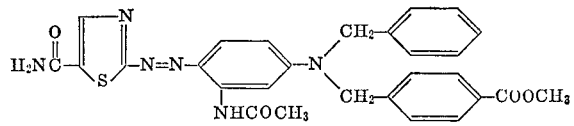

The thiazolylazo compounds appearing in the examples of Table III are prepared by the procedures described in Examples 97 and 98 and conform to the general formula

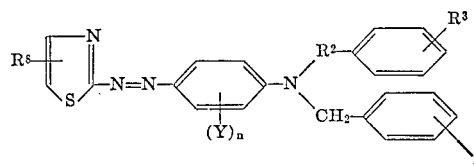

bright fast red shades on polyester fibers and has the structure

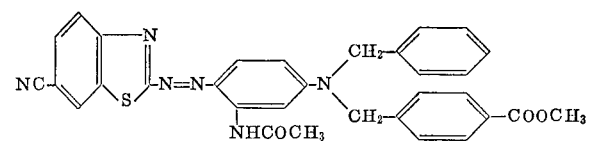

EXAMPLE 130

To 2.28 g. of 2-amino-6-methylsulfonylbenzothiazole suspended in 24 ml. is added 26.2 g. conc. $H_2SO_4$. After all the amine has dissolved, the solution is cooled and a solution of 0.84 g. $NaNO_2$ in 5.0 ml. conc. $H_2SO_4$ is added portionwise below 0° C. The diazotization is stirred for 2 hr. at about 0° C. and then added to a solution of 3.26 g. methyl α-(3-acetamido-N-benzylanilino)-p-toluate dissolved in 75 ml. of 15% $H_2SO_4$, all below 15° C. The temperature is kept at 0–5° C. for 1 hr. and then the coupling mixture is drowned with water. The product is collected by filtration, washed with water, and air

TABLE III

| Example No. | $R^8$ | $(Y)_n$ | $R^2$ | $R^3$ | Position of —COOR⁴ | $R^4$ | Color |
|---|---|---|---|---|---|---|---|
| 99 | 5-NO₂ | 3-CH₃ | —CH₂— | H | 4 | —CH₃ | Blue. |
| 100 | 5-NO₂ | 3-NHCOCH₃ | —CH₂CH₂— | H | 4 | —CH₃ | Do. |
| 101 | 5-NO₂ | 3-NHCOCH₃ | —CH₂— | 4-CH₃ | 4 | —C₂H₅ | Do. |
| 102 | 5-NO₂ | 3-NHCOCH₂OCH₃ | —CH₂— | 4-CH₃ | 4 | —CH₃ | Do. |
| 103 | 5-NO₂ | 3-NHCHO | —CH₂— | 3-COOCH₃ | 3 | 3-COOCH₃ | Do. |
| 104 | 5-NO₂ | 3-NHCOCH₂CN | —CH₂— | H | 4 | —CH₃ | Do. |
| 105 | 5-NO₂ | 3-NHCOCH₂C₆H₅ | —CH₂— | H | 4 | —C₄H₉-n | Do. |
| 106 | 5-NO₂ | 3-NHCOC₆H₅ | —CH₂— | H | 2 | —CH₃ | Do. |
| 107 | 5-NO₂ | 3-NHCONHC₂H₅ | —CH₂— | H | 4 | —CH₃ | Do. |
| 108 | 5-NO₂ | 3-NHCONHC₆H₅ | —CH₂— | H | 4 | —C₂H₅ | Do. |
| 109 | 5-NO₂ | 3-NHCOOC₂H₅ | —CH₂— | H | 4 | —CH₃ | Do. |
| 110 | 5-NO₂ | 2-CH₃-5-NHCOCH₃ | —CH₂— | H | 4 | —CH₃ | Do. |
| 111 | 5-NO₂ | 2-OCH₃-5-NHCOCH₃ | —CH₂— | H | 4 | —CH₃ | Blue-green. |
| 112 | 5-NO₂ | 2-OCH₃-5-NHCOC₆H₅ | —CH₂— | H | 3 | —C₂H₅ | Do. |
| 113 | 5-NO₂ | 3-NHCOC₆H₁₁ | —CH₂— | H | 4 | —CH₃ | Blue. |
| 114 | 5-CONH₂ | 3-NHCOOC₂H₅ | —CH₂CH₂— | 4-OH | 4 | —C₃H₇-n | Red. |
| 115 | 5-CN | 3-NHCOCH₃ | —CH₂— | H | 4 | —CH₃ | Violet. |
| 116 | 5-CN | 3-NHCOCH₃ | —CH₂— | 4-COOCH₃ | 4 | —CH₃ | Do. |
| 117 | 5-SO₂CH₃ | 3-NHCOCH₃ | —CH₂— | H | 4 | —CH₃ | Do. |
| 118 | 5-SO₂CH₃ | 3-NHSO₂CH₃ | —CH₂— | H | 4 | —CH₃ | Do. |
| 119 | 5-Br | 3-NHCOCH₃ | —CH₂— | H | 4 | —CH₃ | Red. |
| 120 | 5-Cl | 3-NHSO₂C₆H₄-p-Cl | —CH₂— | H | 4 | —CH₃ | Do. |
| 121 | 5-COOC₂H₅ | 3-NHCOCH₃ | —CH₂— | H | 4 | —CH₃ | Do. |
| 122 | 4-C₆H₅ | 3-NHCOCH₃ | —CH₂— | H | 4 | —CH₃ | Do. |
| 123 | 4-CF₃ | 3-NHCOCH₃ | —CH₂— | H | 4 | —CH₃ | Do. |
| 124 | 4-CH₃-5-SCN | 3-NHCOCH₃ | —CH₂— | H | 4 | —CH₃ | Do. |
| 125 | 4-NHCOCH₃ | 3-NHCOC₄H₉-n | —CH₂— | H | 4 | —CH₃ | Do. |
| 126 | 4-CH₃-5-NO₂ | 3-NHCOCH₂OC₆H₅ | —CH₂— | H | 4 | —CH₃ | Blue. |
| 127 | 4-CH₃-5-NO₂ | 3-NHSO₂CH₃ | —CH₂— | H | 4 | —CH₃ | Do. |
| 128 | 4-CH₃-5-NO₂ | 3-NHSO₂C₆H₅ | —CH₂— | H | 4 | —CH₃ | Do. |

EXAMPLE 129

Sodium nitrite (0.76 g.) is added portionwise to 5 ml. of conc. $H_2SO_4$. This solution is cooled in an ice bath and 10 ml. 1:5 acid is added, keeping the temperature below 15° C. This mixture is stirred at 0–5° C. and 1.75 g. of 2-amino-6-cyanobenzothiazole is added, followed by 10 ml. of 1:5 acid. The diazotization is stirred at 0–5° C. for 2 hr. and is then added to a solution of 3.26 g. methyl α-(3-acetamido-N-benzylanilino)-p-toluate in 100 ml. of 1:5 acid. The coupling is buffered with solid ammonium acetate and allowed to react at about 5° C. for 2 hr. After drowning in water, the product is collected by filtration, washed with water, and dried in air. The product produces dried. The azo compound obtained gives fast red dyeings on polyester fibers and has the structure:

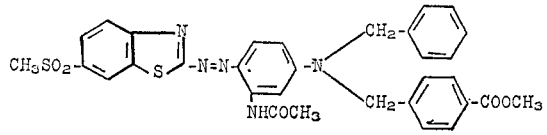

The azo compounds of Table IV are prepared by the procedures described in Examples 129 and 130 and conform to the general formula

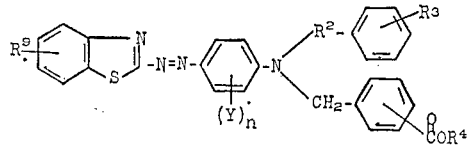

TABLE IV

| Example No. | $R^9$ | $(Y)_n$ | $R^2$ | $R^3$ | Position of —COOR⁴ | $R^4$ | Color |
|---|---|---|---|---|---|---|---|
| 131 | 6-SO₂CH₃ | H | —CH₂— | H | 4 | —CH₃ | Red. |
| 132 | 6-SO₂CH₃ | 3-CH₃ | —CH₂— | H | 4 | —CH₃ | Red. |
| 133 | 6-SO₂CH₃ | 3-Cl | —CH₂— | H | 4 | —CH₃ | Red. |
| 134 | 6-SO₂CH₃ | 2-CH₃ | —CH₂— | H | 4 | —CH₃ | Red. |
| 135 | 6-SO₂CH₃ | 3-NHCOCH₃ | —CH₂CH₂— | H | 4 | —CH₃ | Red. |
| 136 | 6-SO₂CH₃ | 2-OCH₃-3-NHCOCH₃ | —CH₂— | H | 4 | —CH₃ | Violet. |
| 137 | 6-CN | 3-NHCOC₆H₅ | —CH₂— | H | 4 | —CH₃ | Red. |
| 138 | 6-CN | 3-NHSO₂CH₃ | —CH₂— | 4-CH₃ | 3 | —C₂H₅ | Red. |
| 139 | 6-SCN | 3-NHSO₂CH₃ | —CH₂— | H | 2 | —CH₃ | Red. |
| 140 | 6-SCN | 3-NHCONHC₂H₅ | —CH₂— | H | 4 | —CH₃ | Red. |
| 141 | 6-SCN | 3-NHCOCH₃ | —CH₂— | H | 4 | —CH₃ | Red. |

TABLE IV—Continued

| Example No. | R⁹ | (Y)ₙ | R² | R³ | Position of —COOR⁴ | R⁴ | Color |
|---|---|---|---|---|---|---|---|
| 142 | 6-NO₂ | H | —CH₂— | H | 4 | —CH₃ | Bordeaux. |
| 143 | 6-NO₂ | 3-CH₃ | —CH₂— | H | 4 | —CH₃ | Do. |
| 144 | 6-NO₂ | 3-NHCOCH₃ | —CH₂— | 4-CH₃ | 4 | —CH₃ | Violet. |
| 145 | 6-NO₂ | 2-CH₃-5-NHCOCH₃ | —CH₂— | 4-CH₃ | 4 | —CH₃ | Do. |
| 146 | 6-NO₂ | 2-OCH₃-NHCOC₂H₅ | —CH₂— | 4-CH₃ | 4 | —CH₃ | Blue. |
| 147 | 4,6-di-NO₂ | 3-NHCOCH₃ | —CH₂— | H | 4 | —CH₃ | Do. |
| 148 | 4-Br-6-SO₂CH₃ | 3-NHCOCH₃ | —CH₂— | H | 4 | —CH₃ | Violet. |
| 149 | 4-Cl | 3-NHCOCH₃ | —CH₂— | H | 4 | —CH₃ | Red. |
| 150 | 4,6-di-Cl | 3-NHCOCH₃ | —CH₂— | H | 4 | —CH₃ | Red. |
| 151 | 6-Br | 3-NHCOCH₃ | —CH₂— | H | 4 | —CH₃ | Red. |
| 152 | 6-SO₂NH₂ | 3-NHCOCH₃ | —CH₂— | H | 4 | —CH₃ | Red. |
| 153 | 6-SO₂N(CH₃)₂ | 3-NHCOCH₃ | —CH₂— | H | 4 | —CH₃ | Red. |
| 154 | 6-COOC₂H₅ | 3-NHCOCH₃ | —CH₂— | H | 4 | —CH₃ | Red. |
| 155 | 6-COCH₃ | 3-NHCOCH₃ | —CH₂— | H | 4 | —CH₃ | Red. |
| 156 | 6-NHCOCH₃ | 3-NHCOCH₃ | —CH₂— | H | 4 | —CH₃ | Red. |
| 157 | 6-SCH₃ | 3-NHCOCH₃ | —CH₂— | H | 4 | —CH₃ | Red. |
| 158 | 6-SCH₃ | 3-NHCOCH₃ | —CH₂— | H | 4 | —CH₃ | Red. |
| 159 | 6-C₆H₅ | 3-NHCOCH₃ | —CH₂— | H | 4 | —CH₃ | Red. |
| 160 | 6-SO₂CH₂CH₂CN | 3-NHCOCH₃ | —CH₂— | H | 4 | —CH₃ | Pink. |

EXAMPLE 161

Sodium nitrite (0.72 g.) is added to 5 ml. of conc. H₂SO₄ with stirring. The solution is cooled and 10 ml. of 1:5 acid is added below 15° C. The mixture is cooled further and 2-amino-5-ethylthio-1,3,4-thiadiazole (1.61 g.) is added at 0–5° C., followed by an additional 10 ml. of 1:5 acid. After stirring at 0–5° C. for 2 hr., the diazonium solution is added to a cooled solution of methyl α-(3-acetamido-N-benzylanilino)p-toluate (3.87 g.) in 60 ml. of 1:5 acid, plus 40 ml. of 10% HCl. The reaction mixture is buffered with ammonium acetate until a test sample is neutral to Congo Red paper. The coupling mixture is allowed to stand for 1 hr. and then water is added to precipitate the dye. The product is collected by filtration, washed with water, and dried in air. The product, which has the structure

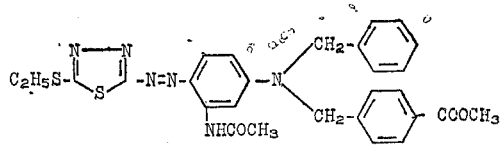

produces brilliant scarlet shades on polyester fiber and possesses excellent fastness properties.

EXAMPLE 162

To 1.63 g. 2-amino-5-methylsulfonyl-1,3,4-thiadiazole slurried in 24 ml. water, is added 14 ml. conc. H₂SO₄. The resulting solution is cooled to 0° C. and a solution of 1.44 g. NaNO₂ in 10 ml. conc. H₂SO₄ is added below 5° C. The diazotization is stirred at ice-bath temperature for 2 hr. It is then added to a cold solution of 4.4 g. 3-benzamido-N,N-di(3 - methoxycarbonylbenzyl)aniline in 100 ml. of 1:5 acid. The coupling is buffered with solid ammonium acetate and allowed to stand 2 hr. It is then drowned in water. The dye is collected by filtration, washed with water, and air dried. The azo compound obtained dyes polyester fibers bright red shades having excellent fastness properties and has the formula

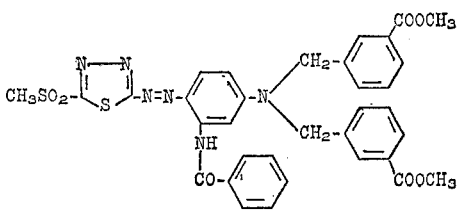

EXAMPLE 163

Sodium nitrite (0.72 g.) is added to 5 ml. conc. H₂SO₄. The solution is cooled and 10 ml. of 1:5 acid is added below 15° C. After cooling further, 5-amino-3-methylthio-1,2,4-thiadiazole is added below 5° C., followed by an additional 10 ml. of 1:5 acid at the same temperature. The diazotization reaction is stirred at 0–5° C. for 2 hr., and then the diazonium solution is added to a cold solution of methyl α-(3-acetamido-N-benzylanilino) p-toluate (3.87 g., .01 m.) dissolved in 60 ml. of 1:5 acid, plus 40 ml. of 10% HCl. The coupling is kept cold and is buffered by the addition of ammonium acetate until a test sample is neutral to Congo Red paper. The coupling is allowed to stand 1 hr. and is then drowned with water. The product is collected by filtration, washed with water and dried in air. The dye

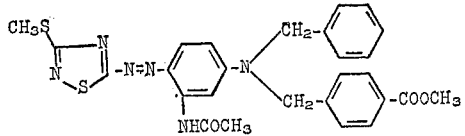

produces beautiful red shades on polyester fibers and has excellent lightfastness and resistance to sublimation.

The thiadiazolylazo compounds set forth in the examples of Table V are prepared by the procedures described in Examples 116 through 163 by diazotizing the appropriate 2-aminothiadiazole and coupling the resulting diazonium salt with an alkyl α-N-benzylanilinotoluate. The compounds of Table V conform to the general formula

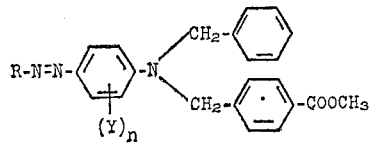

in which diazo component R is a group having the structure

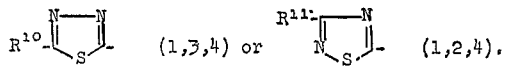

TABLE V

| Example No. | R¹⁰, R¹¹ diazo isomer | (Y)ₙ | Color |
|---|---|---|---|
| 164 | CH₃S-1,3,4 | H | Orange. |
| 165 | CH₃S-1,3,4 | 3-CH₃ | Do. |
| 166 | CH₃S-1,3,4 | 3-NHCOC₂H₅ | Scarlet. |
| 167 | CH₃S-1,3,4 | 3-NHCOC₆H₅ | Do. |
| 168 | C₂H₅S-1,3,4 | 3-NHCONH₂ | Do. |
| 169 | n-C₄H₉S-1,3,4 | 3-NHCOCH₃ | Do. |
| 170 | n-C₄H₉S-1,3,4 | 3-NHSO₂CH₃ | Do. |
| 171 | C₅H₁₁S-1,3,4 | 3-NHCOCH₃ | Do. |
| 172 | CH₃SO₂-1,3,4 | 3-NHCOOC₂H₅ | Violet. |
| 173 | CH₃SO₂-1,3,4 | 3-NHCOC₆H₅ | Do. |
| 174 | C₆H₅-1,3,4 | 3-NHCOCH₃ | Orange. |
| 175 | CH₃-1,3,4 | 3-NHSO₂CH₃ | Do. |
| 176 | p-Cl-C₆H₄-1,3,4 | 3-NHCOCH₃ | Red. |
| 177 | p-CH₃-C₆H₄-1,3,4 | 3-NHCOCH₃ | Red. |
| 178 | p-CH₃O-C₆H₄-1,3,4 | 3-NHCOCH₃ | Red. |
| 179 | Cl-1,3,4 | 3-NHCOCH₃ | Red. |
| 180 | Br-1,3,4 | 3-NHCOCH₃ | Red. |
| 181 | C₆H₅CH₂S-1,3,4 | 3-NHCOCH₃ | Red. |
| 182 | CH₃S-1,2,4 | 3-NHCOOC₂H₅ | Red. |
| 183 | CH₃S-1,2,4 | 3-NHSO₂C₂H₅ | Red. |
| 184 | CH₃S-1,2,4 | 3-NHCONHC₂H₄ | Red. |
| 185 | CH₃S-1,2,4 | 3-NHCOC₂H₅ | Red. |
| 186 | CH₃SO₂-1,2,4 | 3-NHCOCH₃ | Violet. |
| 187 | CH₃SO₂-1,2,4 | 2-OCH₃-5-NHCOCH₃ | Do. |
| 188 | CH₃SO₂-1,2,4 | 2-CH₃-5-NHCOCH₃ | Do. |
| 189 | C₆H₅CH₂S-1,2,4 | 3-NHCOCH₃ | Red. |
| 190 | (CH₃)₂CHCH₂S-1,2,4 | 3-NHCOCH₃ | Red. |

EXAMPLE 191

To 5 ml. of concentrated sulfuric acid is added portionwise 0.72 g. of sodium nitrite with stirring. The nitrosyl sulfuric acid solution is cooled and 10 ml. of 1:5 acid (1 part propionic to 5 parts acetic) is added below 10° C. 2-amino-3-nitro-5-isobutyrylthiophene is added to acid solution followed by 10 ml. of 1:5 acid, all of 0–5° C. The mixture is stirred at 0–5° C. for one hour. The diazonium solution is added to a cold solution of methyl α-(3-acetamido-N-benzylanilino)p-toluate (3.87 g.) in 60 ml. of 1:5 acid plus 40 ml. of 10% HCl. The coupling mixture is stirred occasionally for 1 hr. and is then drowned with water. The blue dye is collected by filtration, washed with water, and dried in air. The dye.

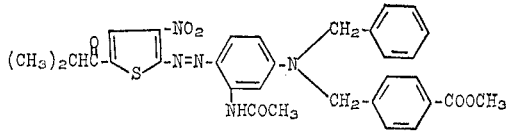

imparts fast blue shades to polyester fibers.

The azo compounds of Table VI are prepared by the procedure described in Example 191 by substituting the appropriate aminothiophene and coupling components. The compounds conform to the formula

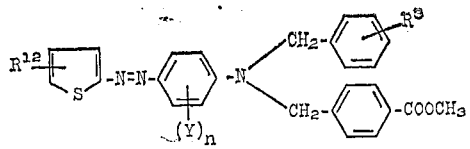

TABLE VI

| Example No. | $R^{12}$ | $(Y)_n$ | $R^3$ | Color |
|---|---|---|---|---|
| 192 | 5-CH₃CO-3-NO₂ | 3-NCHOCH₃ | H | Blue. |
| 193 | 5-CH₃CO-3-NO₂ | 3-NHCOC₆H₅ | H | Do. |
| 194 | 5-CH₃CO-3-NO₂ | 3-NHCOC₂H₅ | 4-CH₃ | Do. |
| 195 | 5-C₂H₅CO-3-NO₂ | 3-NHSO₂CH₃ | H | Do. |
| 196 | 5-(CH₃)₂CHCO-3-NO₂ | 3-NHCOCH₃ | 4-Br | Do. |
| 197 | 5-(CH₃)₂CHCO-3-NO₂ | 3-NHCHO | H | Do. |
| 198 | 5-(CH₃)₂CHCO-3-NO₂ | 3-NHCOC₅H₁₁ | H | Do. |
| 199 | 5-(CH₃)₂CHCO-3-NO₂ | 3-NHCOC₆H₅ | H | Do. |
| 200 | 5-(CH₃)₂CHCO-3-NO₂ | 3-NHCONHC₂H₅ | H | Do. |
| 201 | 5-(CH₃)₂CHCO-3-NO₂ | 2-OCH₃-5-NHCOCH₃ | H | Blue-green. |
| 202 | 5-(CH₃)₂CHCO-3-NO₂ | 3-NHCOC₂H₄Cl | H | Blue. |
| 203 | 5-p-NO₂-C₆H₄CO-3-NO₂ | 3-NHCOCH₃ | H | Do. |
| 204 | 5-p-Cl-C₆H₄CO-3-NO₂ | 3-NHCOCH₃ | H | Do. |
| 205 | 5-CH₃CH₂CH₂-3-NO₂ | 3-NHSO₂C₂H₄Cl | H | Do. |
| 206 | 3,5-di-NO₂ | 3-NHCOCH₃ | H | Blue-green. |
| 207 | 3,5-di-SO₂CH₃ | 3-NHCOCH(CH₃)₂ | H | Turquoise. |
| 208 | 3-NO₂ | 3-NHCOC₄H₉-n | H | Blue. |
| 209 | 5-COOC₂H₅ | 3-NHCOCH₃ | H | Do. |

The compounds of the invention can be used for dyeing linear polyester textile materials in the manner described in U.S. Pats. 2,880,050; 2,757,064; 2,782,187; and 3,043,827. The novel monazo compounds are water-insoluble, i.e. substantially water-insoluble, and therefore they can be applied to polyester fibers according to conventional disperse dyeing techniques. The following example illustrates a carrier dyeing procedure for applying the azo compounds of the invention to dye polyester textile materials.

EXAMPLE 210

The azo compound (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. Three cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

EXAMPLE 211

A mixture of:

500 mg. of the compound of Example 4, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a microsize container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous mixing A thickener and penetrating mixture is prepared by mixing.

1 ml. of a complex diaryl sulfonate surfactant (compound 8–S), 3 ml. of a 3% solution of a sodium N-methyl-N-oleoyl-taurate (Igepon T–Sl), 8 ml. of a 25% solution of natural gums (Superclear 80 N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the compounds of the invention are particularly suitable for dyeing polyester textile materials, the compounds can also be used to dye other synthetic, hydrophobic textile materials such as cellulose acetate, modified polypropylene, polyamide, modacrylic, etc. fibers.

The invention has been described in considerable detail with particular reference to preferred embodiments thereof, but it will be understood that variations and modifications can be effected within the spirit and scope of the invention as described hereinabove.

We claim:

1. A compound having the formula

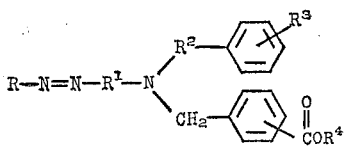

wherein

R is phenyl substituted at the ortho and/or para positions with not more than 3 substituents selected from the group consisting of lower alkyl, lower alkoxy, aryl, nitro, chlorine, bromine, formyl, lower alkanoyl, lower alkoxycarbonyl, aroyl, cyano, lower alkylsulfonyl, arylsulfonyl, trifluoromethyl, sulfamoyl, lower alkylsulfamoyl, carbamoyl, lower alkylcarbamoyl, or thiocyanato, in which each aryl group is phenyl or phenyl substituted with lower alkyl, lower alkoxy, chlorine or bromine;

$R^1$ is p-phenylene; p-phenylene substituted with lower alkyl, lower alkoxy, chlorine, bromine or the group —NHA in which A is formyl, lower alkanoyl, lower cyanoalkanoyl, lower alkoxy-lower-alkanoyl, lower hydroxyalkanoyl, lower alkylsulfonyl-lower-alkanoyl, lower phenylalkanoyl, benzoyl, lower alkylbenzoyl, lower alkoxybenzoyl, chlorobenzoyl, bromobenzoyl, cyclohexylcarbonyl, lower alkoxycarbonyl, phenoxycarbonyl, lower alkylphenoxycarbonyl, lower alkoxyphenoxycarbonyl, chlorophenoxycarbonyl, bromophenoxycarbonyl, lower alkylsulfonyl, lower cyanoalkylsulfonyl, lower hydroxyalkylsulfonyl, lower chloroalkylsulfonyl, bromoalkylsulfonyl, phenylsulfonyl, lower alkylphenylsulfonyl, lower alkoxyphenylsulfonyl, chlorophenylsulfonyl, bromophenylsulfonyl, carbamoyl, lower alkylcarbamoyl, di-lower alkylcarbamoyl, phenylcarbamoyl, lower alkylphenylcarbamoyl, lower alkoxyphenylcarbamoyl, chlorophenylcarbamoyl, or bromophenylcarbamoyl; 1,4-naphthylene; or 1-4-naphthylene substituted with lower alkyl, lower alkoxy, chlorine, bromine or hydroxy;

$R^2$ is alkylene from 1 to about 2 carbon atoms;

$R^3$ is hydrogen, lower alkyl, lower alkoxy, chlorine, bromine, hydroxy, or lower alkoxycarbonyl; and $R^4$ is lower alkyl.

2. A compound according to claim 1 wherein R is a group having the formula

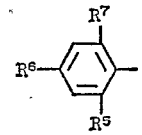

wherein $R^5$ is hydrogen, chlorine, bromine, cyano or nitro;

$R^6$ is nitro, lower alkylsulfonyl, thiocyanato, or sulfamoyl; nad $R^7$ is hydrogen, chlorine, bromine, formyl, lower alkanoyl, lower alkoxycarbonyl, trifluoromethyl, lower alkylsulfonyl, cyano, sulfamoyl, or carbamoyl.

3. A compound according to claim 1 having the formula

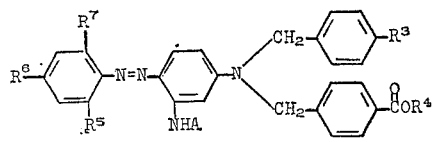

wherein $R^5$ is hydrogen, cyano, or nitro;

$R^6$ is nitro, lower alkylsulfonyl, or thicyanato;

$R^7$ is hydrogen, chlorine, bromine, formyl, lower alkanoyl, lower alkoxycarbonyl, trifluoromethyl, lower alkylsulfonyl, or cyano;

A is lower alkanoyl, benzoyl, lower alkoxycarbonyl, lower alkylsulfonyl, or lower alkylcarbamoyl;

$R^3$ is hydrogen, lower alkyl, lower alkoxy or chlorine; bromine, and $R^4$ is lower alkyl.

4. A compound according to claim 1 having the formula

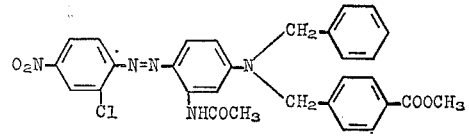

5. A compound according to claim 1 having the formula

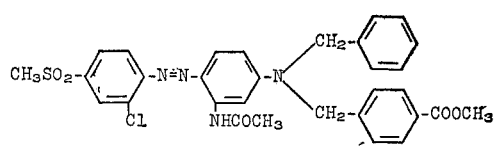

6. A compound according to claim 1 having the formula

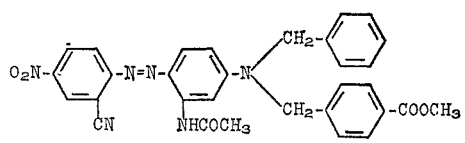

7. A compound according to claim 1 having the formula
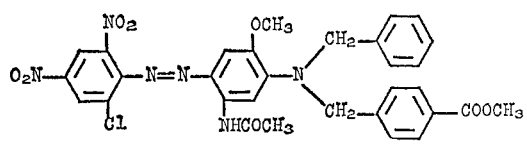
8. A compound according to claim 1 having the formula
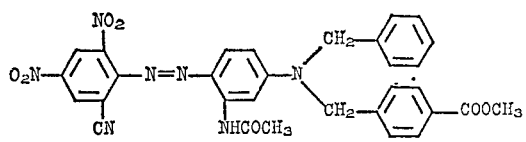
References Cited
UNITED STATES PATENTS
| | | | |
|---|---|---|---|
| 2,117,733 | 5/1938 | Krzikalla et al. | 260—205 |
| 2,249,749 | 7/1941 | Dickey et al. | 260—152 |
| 3,329,669 | 7/1967 | Sartori | 260—158 |
| 3,478,011 | 11/1969 | Artz | 260—205 |
| 3,483,180 | 12/1969 | Ramanathan | 260—158 |
FLOYD DALE HIGEL, Primary Examiner
U.S. Cl. X.R.
260—152, 158, 207.1, 471 R, 471 A